US012800055B2

(12) United States Patent
Tachibana et al.

(10) Patent No.: US 12,800,055 B2
(45) Date of Patent: Nov. 17, 2026

(54) CONTROLLER FOR ELECTROMAGNETIC VALVE

(71) Applicant: TOYOTA JIDOSHA KABUSHIKI KAISHA, Toyota (JP)

(72) Inventors: Mina Tachibana, Toyota (JP); Yuki Suzuki, Kariya (JP); Tomihisa Tsuchiya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/049,007

(22) Filed: Feb. 10, 2025

(65) Prior Publication Data

US 2025/0305593 A1 Oct. 2, 2025

(30) Foreign Application Priority Data

Apr. 1, 2024 (JP) ................................ 2024-059181

(51) Int. Cl.
*F16K 31/06* (2006.01)

(52) U.S. Cl.
CPC ................................ *F16K 31/0679* (2013.01)

(58) Field of Classification Search
None
See application file for complete search history.

(56) References Cited

U.S. PATENT DOCUMENTS 2,575,272 A * 11/1951 Harris .................. F16K 31/408 251/39
4,699,351 A * 10/1987 Wells .................... F16K 31/408 251/38
5,048,790 A * 9/1991 Wells .................... F16K 31/408 251/44
10,161,360 B2 * 12/2018 Ninomiya .......... F02M 21/0233
11,512,655 B2 * 11/2022 Petri ..................... F02D 41/004
12,510,042 B2 * 12/2025 D'Onofrio ......... F02M 21/0239
2004/0045539 A1 * 3/2004 Furuta ................. F16K 31/0679 123/529
2011/0068286 A1 * 3/2011 Nomichi ............. F16K 31/0655 251/129.15

FOREIGN PATENT DOCUMENTS

JP 2008215130 A 9/2008
JP 2022-182969 A 12/2022

* cited by examiner

*Primary Examiner* — Umashankar Venkatesan

(57) ABSTRACT

A controller for an electromagnetic valve provided in a flow passage for a fluid is provided. The electromagnetic valve includes a valve member and an electromagnetic coil that opens the valve member when energized. The controller includes processing circuitry configured to control a current supplied to the electromagnetic coil when the valve member is opened. The processing circuitry is configured to execute a process of reducing the current supplied to the electromagnetic coil when a differential pressure between a pressure acting on the valve member in a valve-closing direction and a pressure acting on the valve member in a valve-opening direction is relatively small, compared to when the differential pressure is relatively large.

7 Claims, 6 Drawing Sheets

CONTROLLER FOR ELECTROMAGNETIC VALVE

CROSS-REFERENCE TO RELATED APPLICATIONS

This application is based upon and claims the benefit of priority from Japanese Patent Application No. 2024-059181, filed on Apr. 1, 2024, the entire contents of which are incorporated herein by reference.

BACKGROUND

1. Field

The present disclosure relates to a controller for an electromagnetic valve.

2. Description of Related Art

For example, a fuel pipe of an internal combustion engine disclosed Japanese Laid-Open Patent Publication No. 2022-182969 includes a valve that selectively allows and blocks the flow of fuel.

When an electromagnetic valve, which opens a valve member by energizing an electromagnetic coil, is employed as the aforementioned valve, it is desirable to reduce the current supplied to the electromagnetic coil when the valve is opened.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a controller for an electromagnetic valve provided in a flow passage for a fluid is provided. The electromagnetic valve includes a valve member and an electromagnetic coil that opens the valve member when energized. The controller includes processing circuitry configured to control a current supplied to the electromagnetic coil when the valve member is opened. The processing circuitry is configured to execute a process of reducing the current supplied to the electromagnetic coil when a differential pressure between a pressure acting on the valve member in a valve-closing direction and a pressure acting on the valve member in a valve-opening direction is relatively small, compared to when the differential pressure is relatively large.

This controller for the electromagnetic valve reduces the current supplied to the electromagnetic coil when the valve is opened.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, an embodiment of a controller for an electromagnetic valve will be described with reference to FIGS. 1 to 6.

Internal Combustion Engine, Fuel Supply Device, and Controller

Figure 1:
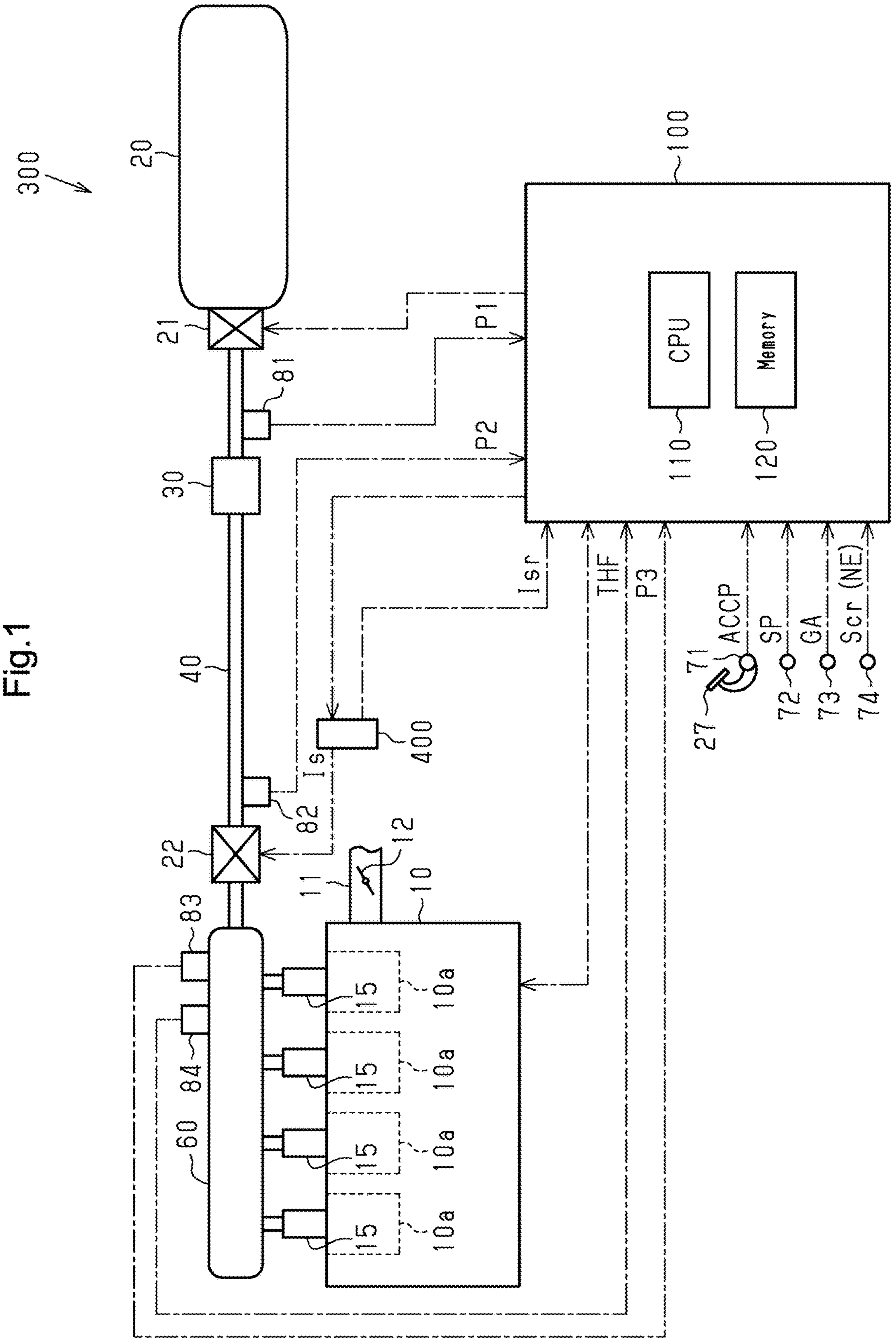
FIG. 1 is a schematic diagram of an internal combustion engine in which a controller for an electromagnetic valve according to an embodiment is employed, a fuel supply system, and the controller.

An internal combustion engine 10 shown in FIG. 1 is an internal combustion engine that is mounted on a vehicle and uses hydrogen gas, which is a fluid gas fuel, as a fuel.

A throttle valve 12 that adjusts an intake air amount is provided in an intake passage 11 of the internal combustion engine 10.

The fuel supply device 300 provided in the internal combustion engine 10 includes fuel injection valves 15, a tank 20, a fuel pipe 40, a first shut-off valve 21, a second shut-off valve 22, a pressure reducing valve 30, and a delivery pipe 60.

The fuel injection valves 15 supply fuel to cylinders **10*a* of the internal combustion engine 10**.

The tank 20 stores hydrogen gas, which is gaseous fuel, in a high-pressure compressed state.

The fuel pipe 40 connects the tank 20 and the delivery pipe 60.

The fuel injection valves 15 are connected to the delivery pipe 60. The fuel pipe 40 and the delivery pipe 60 are a fuel passage connecting the tank 20 and the fuel injection valves 15, and are a flow passage of fluid. The hydrogen gas stored in the tank 20 is supplied to the fuel injection valves 15 via the fuel pipe 40 and the delivery pipe 60.

The first shut-off valve 21, the pressure reducing valve 30, and the second shut-off valve 22 are arranged in the fuel pipe 40 in this order in a direction of fuel flow.

The first shut-off valve 21 is an electromagnetic valve arranged near an outlet of the tank 20. When the first shut-off valve 21 is open, fuel is supplied from the tank 20 to the fuel pipe 40. When the first shut-off valve 21 is closed, the supply of fuel from the tank 20 to the fuel pipe 40 is stopped.

The pressure reducing valve 30 reduces the fuel pressure of the high-pressure hydrogen gas stored in the tank 20 to a prescribed pressure (for example, approximately 4 MPa) and supplies the hydrogen gas to the fuel injection valves 15.

The second shut-off valve 22 is an electromagnetic valve provided in the fuel supply system of the internal combustion engine 10, and is disposed in the vicinity of the delivery pipe 60 in the fuel pipe 40. When the second shut-off valve 22 is open due to energization, fuel is supplied to the delivery pipe 60. When the second shut-off valve 22 is closed due to the de-energization, the supply of fuel to the delivery pipe 60 is stopped.

The first shut-off valve 21 and the second shut-off valve 22 are closed while the operation of the internal combustion engine 10 is stopped. On the other hand, the first shut-off valve 21 and the second shut-off valve 22 are basically open during operation of the internal combustion engine 10.

The first pressure sensor 81 is provided in the fuel pipe 40 between the first shut-off valve 21 and the pressure reducing valve 30. The first pressure sensor 81 detects a first pressure P1 which is a fuel pressure in the fuel pipe 40 between the first shut-off valve 21 and the pressure reducing valve 30.

The second pressure sensor 82 provided in the fuel pipe 40 between the pressure reducing valve 30 and the second shut-off valve 22 detects a second pressure P2 that is the fuel pressure in the fuel pipe 40 between the pressure reducing valve 30 and the second shut-off valve 22.

A third pressure sensor 83 provided in the delivery pipe 60 detects a third pressure P3, which is a fuel pressure in the delivery pipe 60. A temperature sensor 84 provided in the delivery pipe 60 detects a fuel temperature THF which is the temperature of the fuel in the delivery pipe 60.

The controller 100 performs various types of control such as fuel injection of the internal combustion engine 10 by controlling various control targets such as the throttle valve 12, the fuel injection valves 15, the first shut-off valve 21, and the second shut-off valve 22. The controller 100 includes a memory 120 constituted by storage devices such as a CPU 110, a ROM, and a RAM. The CPU 110 corresponds to processing circuitry. The controller 100 performs various controls when the CPU 110 executes a program stored in the memory 120.

The controller 100 refers to various values used to control the internal combustion engine 10. For example, the controller 100 refers to detection values of the first pressure sensor 81, the second pressure sensor 82, the third pressure sensor 83, and the temperature sensor 84. Further, the controller 100 refers to a detection signal of an accelerator position sensor 71 that detects an accelerator operation amount ACCP that is an operation amount of an accelerator pedal 27 operated by a driver of the vehicle on which the internal combustion engine 10 is mounted. In addition, the controller 100 refers to a detection signal of a speed sensor 72 that detects a vehicle speed SP of a vehicle on which the internal combustion engine 10 is mounted. Further, the controller 100 refers to a detection signal of an air flow meter 73 that detects an intake air amount GA of the internal combustion engine 10, and a detection signal Scr of a crank angle sensor 74 that detects a rotation angle of a crankshaft of the internal combustion engine 10.

The controller 100 calculates an engine rotation speed NE based on a detection signal Scr of the crank angle sensor 74. In addition, the controller 100 calculates an engine load factor KL based on the engine rotation speed NE and the intake air amount GA. The engine load factor KL represents the ratio of the current cylinder inflow air amount to the cylinder inflow air amount at the time of steady operation of the internal combustion engine 10 in a full load state at the current engine speed NE. The cylinder inflow air amount is the amount of air that flows into each cylinder in the intake stroke.

Hydrogen gas, which serves as the engine fuel, has a wider range of combustible air-fuel mixtures compared to gasoline and can burn even with a relatively lean air-fuel mixture. Therefore, the controller 100 adjusts the output of the internal combustion engine 10 through the following combustion control.

That is, the controller 100 calculates a required output Pe, which is a required value of the engine output of the internal combustion engine 10, based on the accelerator operation amount ACCP and the like. The controller 100 sets the required injection amount Qd based on the required output Pe. The required injection amount Qd is a target value of the fuel injected from one fuel injection valve 15 in one combustion cycle. Based on the target air-fuel ratio AFt and the required injection amount Qd, the controller 100 calculates a required air amount GAd that is a target value of the intake air amount required for obtaining the target air-fuel ratio AFt. The target air-fuel ratio AFt of the present embodiment is a lean air-fuel ratio such as an excess air ratio 2=2.5 to 3.0, for example. Then, the controller 100 controls the fuel injection valves 15 such that an amount of fuel corresponding to the required injection amount Qd is injected. Further, the controller 100 controls the opening degree of the throttle valve 12 so that an amount of air corresponding to the required air amount GAd is introduced into the cylinder. In this way, in the internal combustion engine 10, the output adjustment is performed by changing the air-fuel ratio of the air-fuel mixture through the adjustment of the fuel injection amount and the intake air amount.

Fuel Pressure Control

The controller 100 executes fuel pressure control for controlling the pressure of the fuel supplied to the fuel injection valves 15, that is, the fuel pressure in the fuel passage connected to the downstream side of the second shut-off valve 22 in the flow direction of the fuel in the fuel passage. This fuel pressure control includes repeatedly performing selective opening and closing of the second shut-off valve 22 so that the fuel pressure in the fuel passage connected downstream of the second shut-off valve 22 becomes a pressure within a control range CR defined by a predetermined upper limit value PtU and a predetermined lower limit value PtL. The target pressure Pt in the fuel pressure control is lower than the second pressure P2, which is the fuel pressure reduced by the pressure reducing valve 30, and is set in advance. For example, the target pressure Pt is about 1 Mpa. An upper limit value of the fuel pressure allowable with respect to the target pressure Pt is set as the upper limit value PtU. Further, a lower limit value of the fuel pressure allowable with respect to the target pressure Pt is set to the lower limit value PtL.

Figure 2:
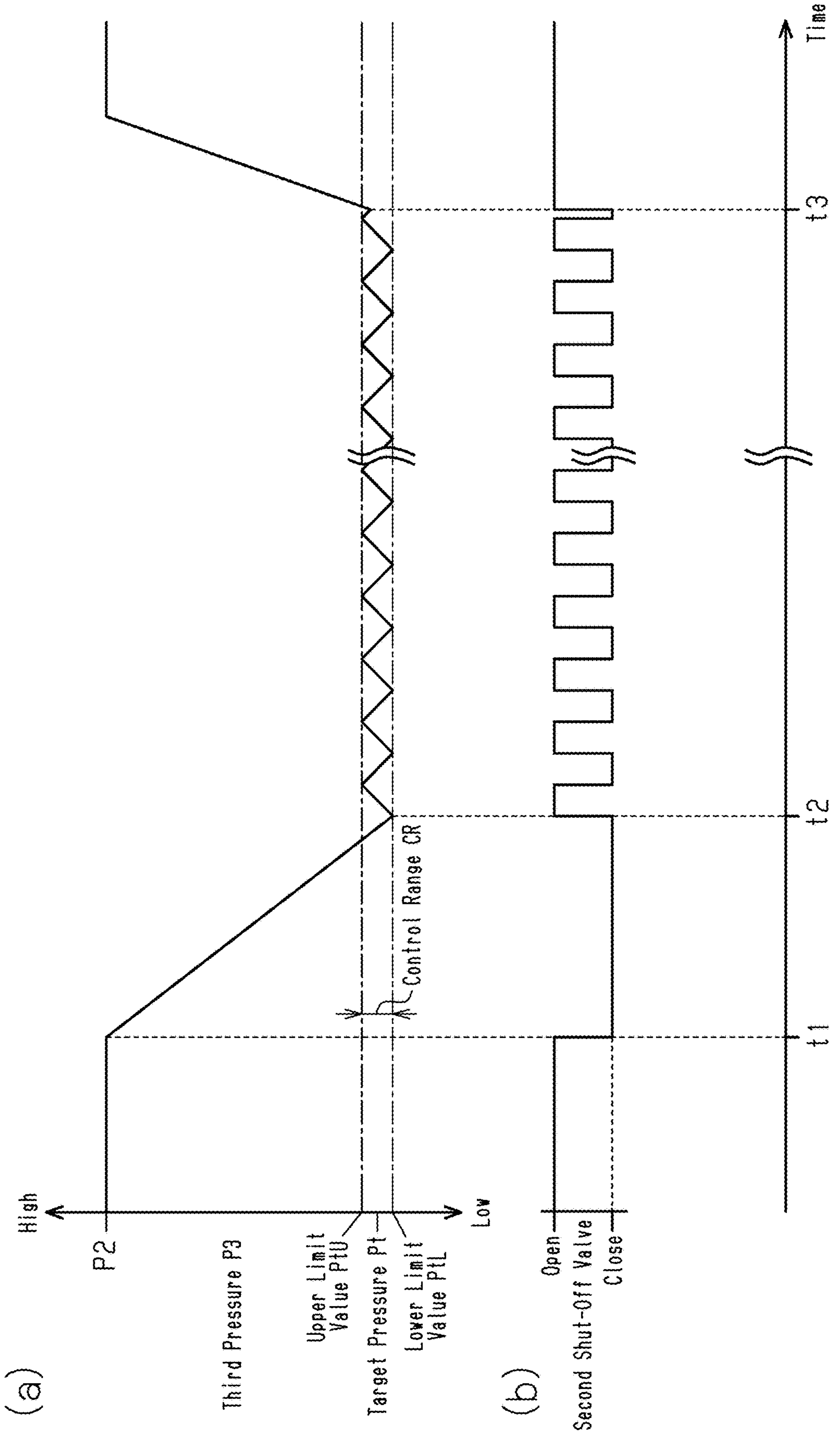
FIG. 2 is a timing diagram showing a fuel pressure control according to the embodiment, in which part (a) shows changes in fuel pressure, and part (b) shows an operating state of a second shut-off valve.

FIG. 2 shows an example of the fuel pressure control. Part (a) of FIG. 2 shows changes in the third pressure P3, and part (b) of FIG. 2 shows the operating state of the second shut-off valve 22. The fuel pressure control is executed, for example, when the operation state of the internal combustion engine 10 shifts to an idle operation state.

Before a point in time t1, the hybrid vehicle is traveling normally, and the second shut-off valve 22 is maintained in the open state. The third pressure P3 is equal to the second pressure P2 that has been reduced by the pressure reducing valve 30.

At the point in time t1, when the internal combustion engine 10 is required to be operated at idle, the second shut-off valve 22 is closed and the closed state is maintained. While the second shut-off valve 22 is closed, the amount of fuel in the delivery pipe 60 decreases each time fuel is injected from the fuel injection valves 15. Thus, the third pressure P3 gradually decreases.

At a point in time t2, the second shut-off valve 22 is opened when the third pressure P3 reaches the lower limit values PtL. Since the fuel is supplied to the fuel passage downstream of the second shut-off valve 22 by the opening of the second shut-off valve 22, the fuel pressure downstream of the second shut-off valve 22 increases. The second shut-off valve 22 is closed when the third pressure P3 reaches the upper limit values PtU. By repeatedly performing such selective opening and closing of the second shut-off valve 22, the pressure of the fuel downstream of the second shut-off valve 22 and supplied to the fuel injection valves 15 is adjusted to a pressure within a predetermined control range CR defined by the upper limit value PtU and the lower limit value PtL.

In this way, when the required injection amount Qd decreases as in the idle operation, the fuel pressure control is performed to maintain the third pressure P3 at a low level. As a result, a small amount of fuel is accurately injected from the fuel injection valves 15.

At a point in time t3, for example, the operation state of the internal combustion engine 10 shifts to a state in which the engine load is higher than that in the idle operation state, so that the execution request of the fuel pressure control is eliminated. Then, the second shut-off valve 22 is maintained in the open state. While the second shut-off valve 22 is open, fuel is supplied from the tank 20 to the delivery pipe 60, so the third pressure P3 gradually increases toward the second pressure P2.

Structure of the Second Shut-Off Valve

Figure 3:
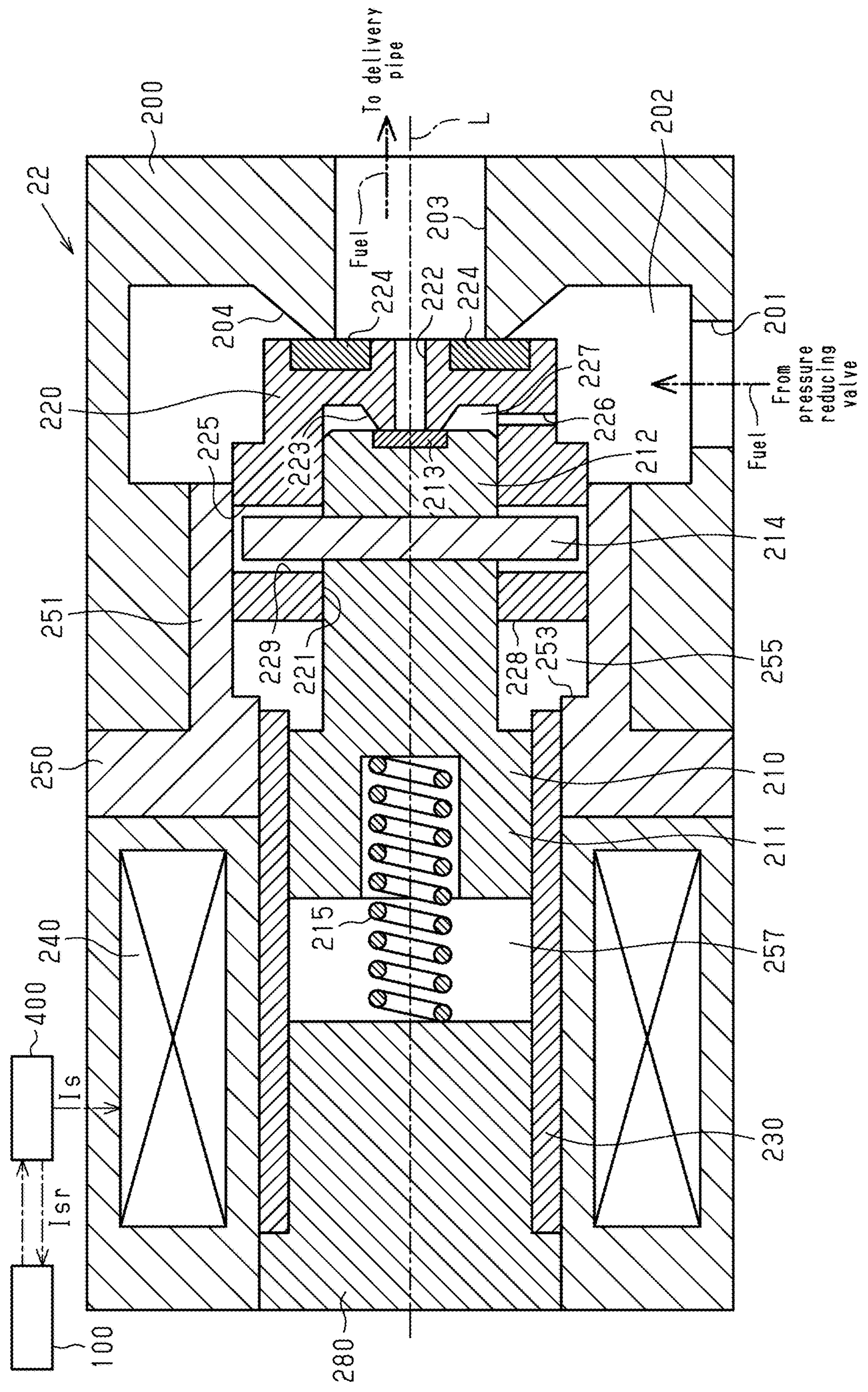
FIG. 3 is a cross-sectional view showing the structure of the second shut-off valve according to the embodiment.

FIG. 3 shows the structure of the second shut-off valve 22. Hereinafter, a direction along the central axis L of the plunger 211 included in the second shut-off valve 22 is referred to as an axial direction. A direction orthogonal to the axial direction is referred to as a radial direction.

The second shut-off valve 22 includes a housing 200, a stator 230, an electromagnetic coil 240, a first valve 210, a holder 250, a second valve 220, and the like.

The housing 200 includes an inlet port 201 to which the fuel pipe 40 connected to the pressure reducing valve 30 is connected, and an outlet port 203 to which the fuel pipe 40 connected to the delivery pipe 60 is connected.

The inlet port 201 and the outlet port 203 are connected to each other via a first chamber 202 which is a space formed in the housing 200.

The stator 230 has a cylindrical shape and is provided in the housing 200.

The electromagnetic coil 240 is provided on the outer peripheral side of the stator 230. The electromagnetic coil 240 opens the valve member when energized. The electromagnetic coil 240 is connected to a drive circuit 400 for supplying electric power. The drive circuit 400 adjusts a supply current Is which is a current supplied to the electromagnetic coil 240 when the valve member included in the second shut-off valve 22 is opened. The drive circuit 400 is connected to the controller 100. The controller 100 controls the supply current Is via the drive circuit 400. As the force biasing the valve member in the valve closing direction increases, the value of the supply current Is required to open the valve member increases.

The drive circuit 400 detects an actual current Isr which is an actual current value flowing through the electromagnetic coil 240 with respect to the controller 100. Then, the detected value of the actual current Isr is output to the controller 100.

The first valve 210, which is a first valve member, includes a plunger 211 that moves in the axial direction inside the stator 230, and a first seal member 213 that opens and closes the first fuel passage 222 by the movement of the plunger 211.

One end of the plunger 211 is a projection 212 protruding from the stator 230. The first seal member 213 is provided at the distal end of the projection 212. The projection 212 includes a pin 214 extending in the radial direction. Both ends of the pin 214 protrude from the outer peripheral surface of the projection 212.

The holder 250 has a cylindrical portion 251 coaxial with the central axis L. The inner peripheral surface of the cylindrical portion 251 is opposed to and spaced apart from the outer peripheral surface of the projection 212.

The second valve 220, which is a second valve member, is slidably accommodated in the inner circumferential surface of the cylindrical portion 251. The second valve 220 has a hole 221 in which the outer peripheral surface of the projection 212 of the first valve 210 slides. The second valve 220 is formed with a long hole 225 into which the pin 214 is inserted and which allows the pin 214 to move in the axial direction.

The first fuel passage 222 extending in the axial direction is formed at the distal end of the second valve 220. The first fuel passage 222 is connected to the outlet port 203 constituting the second fuel passage. The outlet port 203 is a fuel passage having a larger flow passage cross-sectional area than the first fuel passage 222.

A second seal member 224 for opening and closing the outlet port 203 is provided at the distal end of the second valve 220. More specifically, the second seal member 224 opens and closes a second valve seat 204 provided at one end of the outlet port 203.

A first valve seat 223 protruding toward the projection 212 is formed at the distal end of the second valve 220 where the first fuel passage 222 is formed. When the first valve seat 223 is opened and closed by the first seal member 213, the first fuel passage 222 is opened and closed. The first fuel passage 222 is a connecting passage that connects a flow passage on the upstream side of a second valve 220, which is a second valve member, to a flow passage on the downstream side of the second valve 220. The flow passage on the upstream side of the second valve 220 includes a pressure chamber 227 to be described later, a connecting passage 226 to be described later, the first chamber 202, and the inlet port 201. The flow passage downstream of the second valve 220 is the outlet port 203. The first valve 210 is a first valve member that opens prior to the opening of the second valve 220 and opens and closes the first fuel passage 222.

In the hole 221, a space surrounded by a wall surface around the first valve seat 223 and a distal end surface of the projection 212 serves as a pressure chamber 227 on which a pressure for biasing the second valve 220 in the valve closing direction acts. The pressure chamber 227 is connected to the first chamber 202 via a connecting passage 226.

A second chamber 255, which is a space for securing a stroke amount of the second valve 220 in the axial direction, is formed on the inner peripheral surface side of the cylindrical portion 251 of the holder 250.

The second valve 220 has an end surface 228 on the side opposite to the side on which the second seal member 224 is disposed. The holder 250 has a restriction portion 253 constituted by a surface facing the end surface 228. The end surface 228 and the restriction portion 253 are in contact with each other when the second valve 220 is in the fully open state. Since the end surface 228 and the restriction portion 253 are maintained in contact with each other, the position of the valve member when the second valve 220 is in the fully open state is stabilized.

An end cap 280 is provided inside the stator 230 at the end opposite to the side where the plunger 211 is inserted. A third chamber 257 as a space is formed between the end cap 280 and the plunger 211. A spring 215 is provided between the end cap 280 and the plunger 211 to bias the plunger 211 in a direction away from the end cap 280.

Opening and Closing Operation of the Second Shut-Off Valve

When the electromagnetic coil 240 is energized, the plunger 211 is drawn into the stator 230. As a result, the first valve 210 moves in a direction in which the first seal member 213 separates from the first valve seat 223, whereby the first valve 210 is opened. When the first seal member 213 is separated from the first valve seat 223, the fuel flowing in from the inlet port 201 flows into the outlet port 203 via the first chamber 202, the connecting passage 226, the pressure chamber 227, and the first fuel passage 222.

When the first valve 210 moves in a direction in which the first seal member 213 separates from the first valve seat 223, the pin 214 of the first valve 210 comes into contact with the wall surface 229 positioned in the valve opening direction of the first valve 210 in the axial direction of the long hole 225 of the second valve 220. Therefore, a valve opening force Fop acting in the same direction as the moving direction of the first valve 210 is applied to the second valve 220. The valve opening force Fop is an attraction force generated by the magnetic force of the electromagnetic coil 240, and acts in a direction in which the second valve 220 opens.

When the first valve 210 is opened, the pressure chamber 227 and the outlet port 203 are connected to each other, and thus the differential pressure between the inside of the pressure chamber 227 and the inside of the outlet port 203 decreases. Therefore, a resisting force Fcl, which is a force against the opening of the second valve 220, decreases. The resisting force Fcl includes a force acting in the valve closing direction of the second valve 220, a sliding resistance of the second valve 220 and the holder 250, and the like. Further, the force acting in the valve closing direction of the second valve 220 includes a differential pressure load generated by the differential pressure between the inside of the pressure chamber 227 and the inside of the outlet port 203 and the biasing force of the spring 215.

Then, when the valve opening force Fop becomes larger than the resisting force Fcl, the second valve 220 moves in a direction in which the second seal member 224 separates from the second valve seat 204, whereby the opening operation of the second valve 220 is performed. When the second seal member 224 is separated from the second valve seat 204, the fuel flowing in from the inlet port 201 flows into the outlet port 203 mainly via the first chamber 202.

When the second valve 220 is fully opened, the axial movement of the second valve 220 is stopped by the contact between the end surface 228 and the restriction portion 253.

The fuel flowing into the outlet port 203 is sent to the fuel injection valves 15 via the fuel pipe 40 and the delivery pipe 60.

When the energization of the electromagnetic coil 240 is stopped, the first valve 210 moves in a direction in which the first seal member 213 comes into contact with the first valve seat 223 due to the biasing force of the spring 215 or the like. Thus, the closing operation of the first valve 210 is performed.

When the first seal member 213 abuts against the first valve seat 223, the biasing force of the spring 215 acts on the second valve 220. Therefore, the second valve 220 moves in a direction in which the second seal member 224 comes into contact with the second valve seat 204. Thus, the closing operation of the second valve 220 is performed.

In this way, in the second shut-off valve 22, the opening of the second valve 220 that opens and closes the outlet port 203 having a larger flow passage cross-sectional area than the first fuel passage 222 is performed by using the pressure of the pressure chamber 227. Therefore, the magnetic force required for opening the second valve 220 can be reduced as compared with the case where the second valve 220 is opened by directly using the magnetic force of the electromagnetic coil. Therefore, the electromagnetic coil 240 can be miniaturized.

Further, in the second shut-off valve 22, the first valve 210 is used to regulate the fuel at a small flow rate. Therefore, the fuel pressure control described above is performed by selectively opening and closing the first valve 210. Further, in an operating state where the engine load is higher than in the idle operating state, the second valve 220 is opened.

Control of Supply Current

Figure 4:
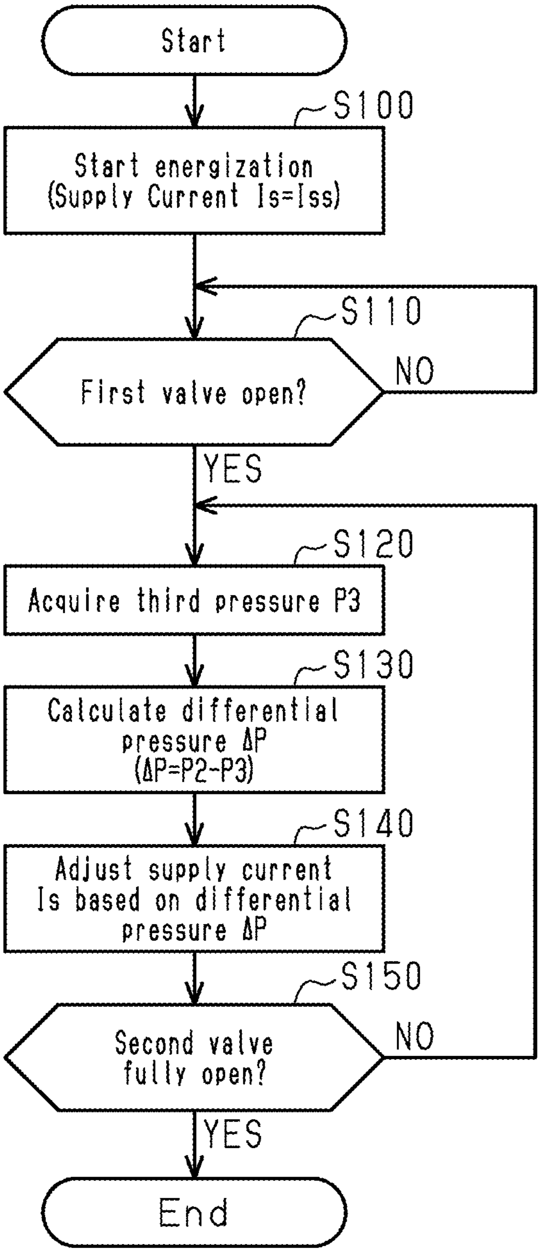
FIG. 4 is a flowchart showing a procedure of processes executed by the controller according to the embodiment.

FIG. 4 shows a procedure of a process executed by the controller 100 to control the supply current Is described above. The process shown in FIG. 4 is performed by the CPU 110 executing a program stored in the memory 120 of the controller 100. Execution of the process shown in FIG. 4 is started when there is a request to open the second valve 220. The valve opening request of the second valve 220 is made, for example, at the time of engine start. In the following description, the number of each step is represented by the letter S followed by a numeral.

When this process is started, the controller 100 starts energization of the electromagnetic coil 240 (S100). In the process of S100, the controller 100 substitutes the initial current Iss for the supply current Is. The initial current Iss is a maximum value of the supply current Is required for opening the first valve 210 and the second valve 220, and is set in advance. When the initial current Iss is substituted into the supply current Is, the controller 100 controls the drive circuit 400 such that the initial current Iss is supplied to the electromagnetic coil 240.

Next, the controller 100 determines whether or not the first valve 210 is opened (S110). The valve opening determination in the process of the S110 can be performed as appropriate. For example, when the first valve 210 is opened, the fuel is supplied to the delivery pipe 60, so that the third pressure P3 changes. Therefore, when a change in the third pressure P3 is detected after the process of the S100 is executed, it can be determined that the first valve 210 is opened.

Then, the controller 100 repeatedly executes the process of S110 until an affirmative determination is made in the process of S110.

When it is determined in the process of S110 that the first valve 210 is opened (S110: YES), the controller 100 acquires the third pressure P3 (S120).

Next, the controller 100 calculates the differential pressure AP (S130). The controller 100 substitutes a value obtained by subtracting the second pressure P2 from the acquired third pressure P3 for the differential force AP. The second pressure P2 is a fuel pressure reduced by the pressure reducing valve 30, and is a predetermined value. The second pressure P2 acts on the second valve 220 in the valve-closing direction, and the third pressure P3 acts on the second valve 220 in the valve-opening direction.

Next, the controller 100 executes a process of adjusting the supply current Is based on the differential pressure AP (S140). In the S140, the controller 100 sets the supply current Is based on the differential pressure AP.

Figure 5:
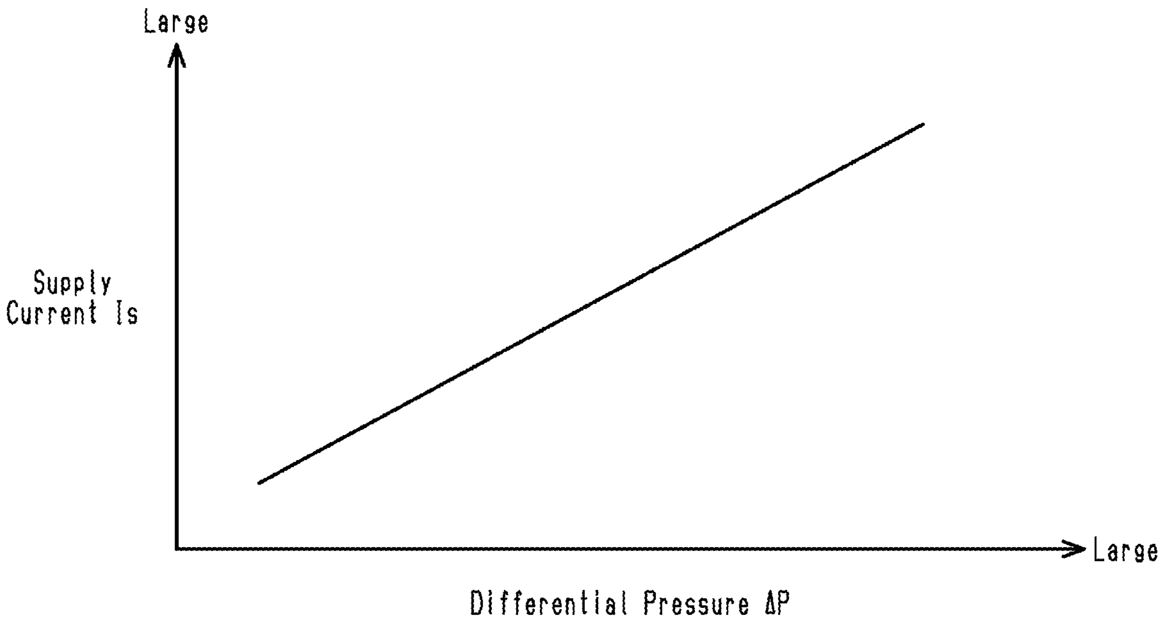
FIG. 5 is a graph showing a relationship between a differential pressure and a supply current according to the embodiment.

As shown in FIG. 5, the controller 100 sets the supply current Is such that the value of the supply current Is is smaller when the differential pressure AP is small than when the differential pressure AP is large. The setting of the supply current Is is performed based on, for example, a setting map that is stored in the memory 120 and indicates a correspondence relationship between the differential pressure AP and the supply current Is. When the supply current Is is set, the controller 100 controls the drive circuit 400 so that the set supply current Is is supplied to the electromagnetic coil 240. The process of S140 reduces the current supplied to the electromagnetic coil when the differential pressure between the pressure acting on the valve member in the valve-closing direction and the pressure acting on the valve member in the valve-opening direction is relatively small, compared to when the differential pressure is relatively large.

Next, the controller 100 determines whether or not the second valve 220 is in the fully open state (S150). The full-open determination in the process of S150 can be performed as appropriate. For example, when the second valve 220 is fully opened, the actual current Isr flowing through the electromagnetic coil 240 temporarily decreases. Therefore, when a temporary decrease in the actual current Isr is detected, it can be determined that the second valve 220 is in the fully open state. Further, when the second valve 220 is in the fully open state, the third pressure P3 is maintained in a state equal to the second pressure P2. Therefore, when such a behavior of the third pressure P3 is detected, it can be determined that the second valve 220 is in the fully open state.

Then, the controller 100 repeatedly executes the processes of S120, S130, S140, and S150 until an affirmative determination is made in the process of S150.

When a positive determination is made in the process of S150 (S150: YES), the controller 100 maintains the current supply current Is and ends the present process.

Operation of the Present Embodiment

Figure 6:
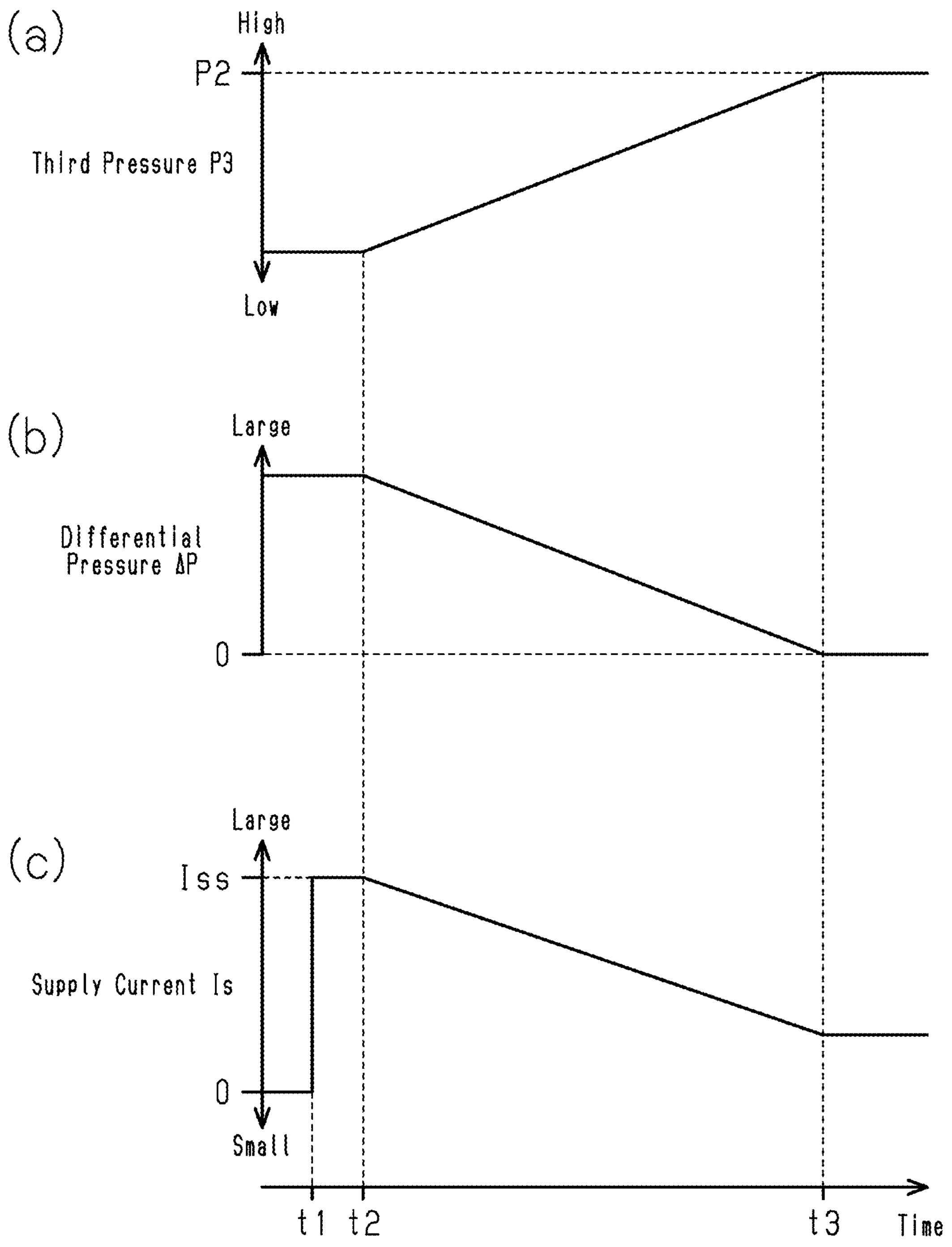
FIG. 6 is a timing diagram showing an operation of the embodiment, in which part (a) shows changes in a third pressure, part (b) shows changes in the differential pressure, and part (c) shows changes in the supply current.

FIG. 6 shows changes in each value when the second valve 220 is opened. Part (a) of FIG. 6 shows changes in the third pressure P3, part (b) of shows changes in the differential pressure AP, and part (c) of FIG. 6 shows changes in the supply current Is.

When a request to start the engine is generated at the point in time t1, the initial current Iss is supplied to the electromagnetic coil 240. The third pressure P3 before the point in time t1 is the fuel pressure when the engine is in a stopped state. Incidentally, the fuel pressure during the engine stop is often the fuel pressure at the time of the engine stop, for example, the fuel pressure during the idle operation. Therefore, the third pressure P3 before the point in time t1 is often close to the target pressure Pt, for example.

When the first valve 210 is opened at the point in time t2 after the initial current Iss is supplied to the electromagnetic coil 240, the fuel flows from the inlet port 201 to the outlet port 203 via the first fuel passage 222 and the like. Therefore, the third pressure P3 on the downstream side of the outlet port 203 gradually increase with time.

The differential pressure AP gradually decreases as the third pressure P3 increases. Therefore, after the point in time t2, the supply current Is gradually decreases from the initial current Iss.

When the second valve 220 is fully opened at the point in time t3, the supply current Is at that time is maintained. Further, the third pressure P3 is equal to the second pressure P2.

Advantages of the Present Embodiment (1) When the differential pressure AP between the pressure acting on the second valve 220 in the valve closing direction and the pressure acting on the second valve 220 in the valve opening direction is small, the force pressing the second valve 220 in the valve closing direction is smaller than that when the differential pressure AP is large. Therefore, the attraction force of the electromagnetic coil 240 required for opening the second valve 220 can be reduced by an amount corresponding to a reduction in the resisting force generated by the differential pressure between the pressure chamber 227 and the outlet port 203, that is, the resisting force corresponding to the differential pressure load generated by the differential pressure AP, in the resisting force Fcl. Therefore, when the differential pressure AP is small, the second valve 220 is opened even if the current supplied to the electromagnetic coil 240 is reduced. Therefore, in the process of the S140 shown in FIG. 4, when the differential pressure AP is small at the time of opening the second valve 220, the controller 100 executes a process of reducing the current supplied to the electromagnetic coil 240. Therefore, as compared with the case where the current supplied to the electromagnetic coil 240 is set to a constant value, the current supplied to the electromagnetic coil 240 when the second valve 220 is opened can be reduced.

(2) Since the electric current supplied to the electromagnetic coil 240 decreases when the second valve 220 is opened, the attraction force of the electromagnetic coil 240 decreases. When the attraction force of the electromagnetic coil 240 decreases, the collision speed at which the end surface 228 and the restriction portion 253 abut against each other when the second valve 220 is in the fully open state decreases. Therefore, it is possible to reduce the valve opening noise generated by the contact of the end surface 228 with the restriction portion 253.

(3) In addition, when the attraction force of the electromagnetic coil 240 decreases, the collision load when the end surface 228 and the restriction portion 253 abut against each other when the second valve 220 is in the fully open state decreases. Therefore, it is possible to suppress wear of the end surface 228 and wear of the restriction portion 253 due to the contact.

(4) Since the current supplied to the electromagnetic coil 240 is reduced, it is possible to suppress heat generation of the electromagnetic coil 240 due to energization.

(5) Since heat generation of the electromagnetic coil 240 due to energization is suppressed, the life of the electromagnetic coil 240 can be extended.

(6) The second shut-off valve 22 includes the first fuel passage 222, which is a connecting passage that connects the flow passage upstream of the second valve 220 to the flow passage downstream of the second valve 220. The second shut-off valve 22 has a first valve 210 that opens prior to the opening of the second valve 220 and selectively opens and closes the first fuel passage 222.

With such a configuration, prior to the opening of the second valve 220, the flow passage on the upstream side of the second valve 220 and the flow passage on the downstream side of the second valve 220 are in fluid connection with each other. Therefore, the differential pressure AP between the pressure acting on the second valve 220 in the valve closing direction and the pressure acting on the second valve 220 in the valve opening direction becomes small. Therefore, as compared with the case where the first fuel passage 222 and the first valve 210 are not provided, the current supplied to the electromagnetic coil 240 can be further reduced.

Modifications

The above-described embodiment may be modified as follows. The above-described embodiment and the following modifications can be combined if the combined modifications remain technically consistent with each other.

The second shut-off valve 22 may not include the first valve 210. In this case, the second valve 220 may be directly opened and closed by the electromagnetic coil 240.

The second shut-off valve 22 is an electromagnetic valve applied to the fuel pressure control described above, but may not be applied to such fuel pressure control. For example, the second shut-off valve 22 may be controlled so as to be held in an open state during engine operation, while being held in a closed state while engine operation is stopped.

The setting of the supply current Is based on the differential pressure AP is performed based on the map. In addition, the attraction force of the electromagnetic coil 240 required for opening the second valve 220 is calculated based on the differential pressure AP. Then, the supply current Is at which the calculated attraction force is obtained may be obtained from a predetermined map.

When the second valve 220 is opened, the current supplied to the electromagnetic coil 240 can be reduced. Therefore, the power consumption of the electromagnetic coil 240 can be reduced. Therefore, when the internal combustion engine 10 and the electric motor are provided as driving sources of the vehicle, the following effects can be obtained. That is, since the power consumption of the battery for driving the electric motor is suppressed, the cruising distance in the traveling mode using the electric motor is extended. Further, since the operation of the internal combustion engine for charging the battery can be suppressed, the fuel consumption for charging the battery can be suppressed.

The fuel of the internal combustion engine 10 is hydrogen gas, which is a gaseous fuel, but may be another gaseous fuel such as compressed natural gas.

The fuel of the internal combustion engine 10 is a gas fuel, but may be a liquid fuel.

The flow passage of the fluid is the fuel passage of the internal combustion engine 10, but may be another flow passage.

The controller 100 is not limited to a device that includes a CPU and a memory and executes software processing. For example, the controller 100 may include a dedicated hardware circuit, such as an application specific integrated circuit (ASIC), that performs hardware processing on at least a part of the software processing in the above-described embodiment. That is, the controller 100 may be modified as long as it includes processing circuitry that has any one of the following configurations (a) to (c). (a) Processing circuitry including at least one processor that executes all of the above-described processes according to programs and at least one program storage device such as a ROM that stores the programs. (b) Processing circuitry including at least one processor and at least one program storage device that execute part of the above-described processes according to the programs and at least one dedicated hardware circuit that executes the remaining processes. (c) Processing circuitry including at least dedicated hardware circuit that executes all of the above-described processes. The program storage device, which is a computer-readable medium, includes any type of medium that is accessible by a general-purpose computer or a dedicated computer.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for an electromagnetic valve provided in a flow passage for a fluid, the electromagnetic valve including a valve member and an electromagnetic coil that opens the valve member when energized, the controller comprising:

processing circuitry configured to control a current supplied to the electromagnetic coil when the valve member is opened, wherein the electromagnetic valve is provided between an upstream-side flow passage and a downstream-side flow passage, wherein a first pressure sensor is configured to detect a first pressure in a fuel pipe, wherein a second pressure sensor is configured to detect a second pressure in the upstream-side flow passage, the second pressure acting on the valve member in a valve-closing direction, wherein a third pressure sensor is configured to detect a third pressure in the downstream-side flow passage, the third pressure acting on the valve member in a valve-opening direction, wherein the processing circuitry is configured to execute a process of reducing the current supplied to the electromagnetic coil when a differential pressure between the second pressure detected by the second pressure sensor and the third pressure detected by the third pressure sensor is relatively small, compared to when the differential pressure is relatively large, and wherein the processing circuitry is configured to calculate the differential pressure based on the second pressure detected by the second pressure sensor and the third pressure detected by the third pressure sensor and set the current supplied to the electromagnetic coil based on the calculated differential pressure.

2. The controller for the electromagnetic valve according to claim 1, wherein the electromagnetic valve includes:

a first valve member; and a second valve member that is the valve member, and a connecting passage that connects a flow passage on an upstream side of the second valve member to a flow passage on a downstream side of the second valve member, and the first valve member opens prior to the opening of the second valve member and selectively opens and closes the connecting passage.

3. The controller for the electromagnetic valve according to claim 1, wherein the flow passage for the fluid is a fuel passage of an internal combustion engine.

4. The controller for the electromagnetic valve according to claim 3, wherein the fluid is hydrogen gas supplied to the internal combustion engine.

5. The controller for the electromagnetic valve according to claim 1, wherein the processing circuitry is configured to calculate the differential pressure by subtracting the second pressure from the third pressure.

6. The controller for the electromagnetic valve according to claim 1, wherein the processing circuitry is configured to set the current using a map stored in a memory, the map indicating a correspondence relationship between the differential pressure and the current supplied to the electromagnetic coil.

7. The controller for the electromagnetic valve according to claim 1, wherein the processing circuitry is configured to maintain the current supplied to the electromagnetic coil when determining that the valve member is fully open.

* * * * *